United States Patent

[11] 3,574,314

| [72] | Inventor | Roger Charles Quercia<br>Paris, France |
|---|---|---|
| [21] | Appl. No. | 788,827 |
| [22] | Filed | Jan. 3, 1969 |
| [45] | Patented | Apr. 13, 1971 |
| [73] | Assignee | Flaminaire Marcel Quercia<br>Paris, France |
| [32] | Priority | Jan. 9, 1968 |
| [33] | | France |
| [31] | | 135,392 |

[54] COUPLING FOR CONNECTING A RECHARGEABLE RESERVOIR WITH A PRESSURISED RECHARGING TANK
1 Claim, 1 Drawing Fig.

[52] U.S. Cl. ................................................ 141/349,
141/286, 141/393, 137/613, 137/616, 137/517,
137/523, 251/142
[51] Int. Cl. ...................................................... B65b 1/04
[50] Field of Search.......................................... 141/348,
349; 137/543.23, 614.04; 251/149.5, 334

[56] References Cited
UNITED STATES PATENTS

| 2,054,348 | 9/1936 | Wantz............................ | 251/149.5 |
| 2,192,339 | 3/1940 | Wilson........................... | 251/334 |
| 2,989,091 | 6/1961 | Lowenthal..................... | 141/349 |
| RE 26,193 | 4/1967 | Labat............................. | 141/348 |
| 3,318,346 | 5/1967 | Maltner......................... | 141/349 |
| 3,402,747 | 9/1968 | Tissot-Dupont.............. | 141/348 |

*Primary Examiner*—Fred C. Mattern, Jr.
*Assistant Examiner*—Wesley S. Ratliff, Jr.
*Attorney*—Michael S. Striker ABSTRACT: A coupling for connecting a gas lighter reservoir to a high-pressure refill tank comprises a first coupling member fitted to the lighter reservoir and providing a screw-threaded socket to receive a screw-threaded spigot on a second coupling member of the refill tank. Both coupling members have check valves urged into their closed positions by a compression spring, the compression spring in the first coupling member being weaker than that in the second coupling member and the valve members of the check valves being provided with means acting between the members when the coupling members are screwed together to displace the first valve member, in the first coupling member and subsequently the valve member in the second coupling member from their respective seats. An abutment is provided in the first coupling member which engages the respective coupling member before its compression spring is compressed sufficiently to cause permanent deformation to the valve member in the second coupling member being displaced after the valve member in the first coupling member has engaged said abutment.

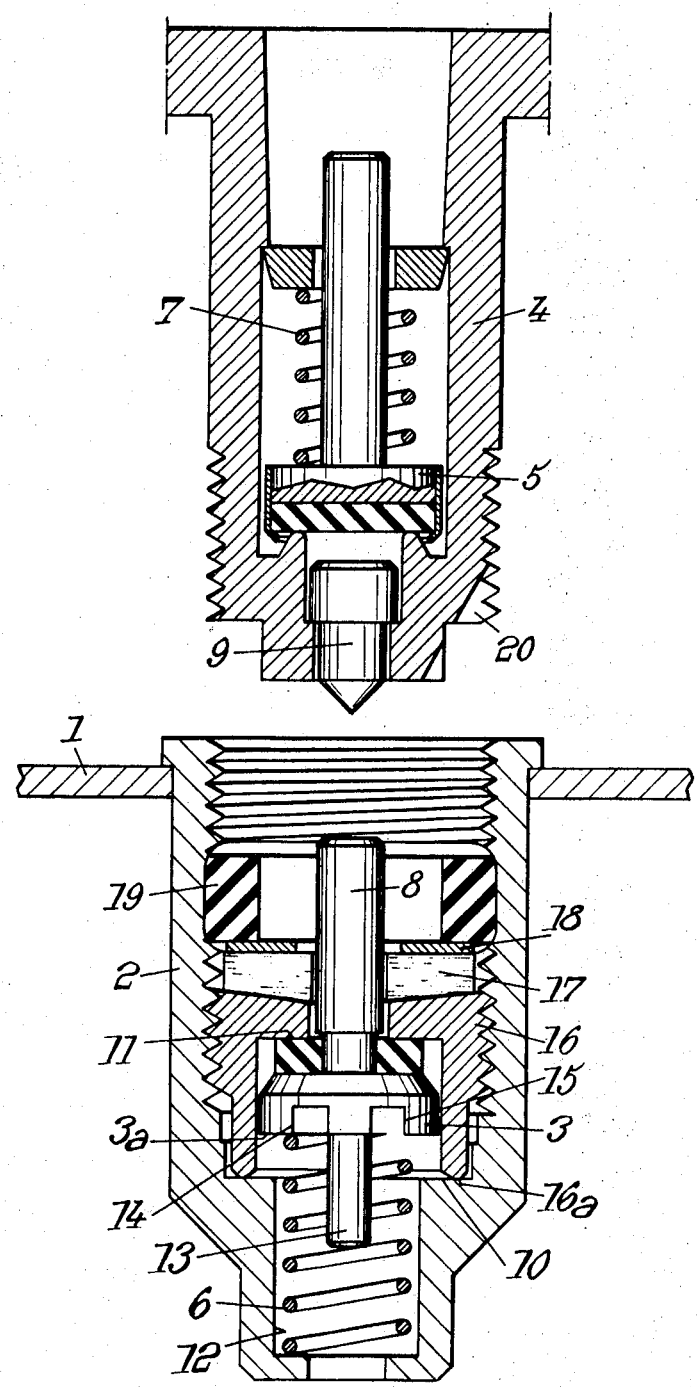

COUPLING FOR CONNECTING A RECHARGEABLE RESERVOIR WITH A PRESSURISED RECHARGING TANK

This invention relates to a coupling for connecting a rechargeable reservoir with a pressurized recharging tank, for example for coupling the gas reservoir of a gas lighter with a recharging gas vessel.

It is an object of the invention to provide an improved coupling of this type.

According to the invention we provide a coupling for connecting a rechargeable reservoir with a pressurized recharging feed tank comprising a first coupling member adapted to be fitted to the rechargeable reservoir and a second coupling member adapted to be fitted to the feed tank, one of said members being formed with a spigot and having a conduit extending axially from said spigot through the member and the other of the said members being formed with a complementary socket to receive said spigot and having a conduit extending axially from the socket through the member, each member having a valve seat around its conduit, a valve member movable axially of the conduit away from the spout or socket, from a position in which it engages the valve seat to seal off the conduit, against the force of an associated compression spring to open the valve, each coupling member including within its conduit an element associated with its valve member and arranged, when depressed to move the valve member axially from its seat, the compression spring of the first coupling member being weaker than the compression spring of the second coupling member and the first coupling member having an abutment adapted to engage its valve member and limit axial movement thereof away from its valve seat to an extent less than that required to compress its associated spring fully, the arrangement being such that during insertion of the spigot on said one member into the socket on the other member, said elements interengage and the valve member in said first coupling member is first displaced from its seat and into engagement with said abutment, and thereafter the valve member in said second coupling member is displaced from its seat to allow fluid under pressure to pass from the recharging tank to the rechargeable reservoir.

Preferably in one coupling member said abutment is provided on one part of the coupling member and said valve seat is provided on another part of the coupling member, one of said parts being screw threaded into the other, being formed of a harder material than the other, and being provided with a sharp annular edge arranged to bite into a corresponding shoulder on the other of said parts when the parts are screwed together, to provide a hermetic seal between said parts.

In the preferred embodiment of the invention the coupling is used to connect a gas reservoir of a gas lighter to a pressurized recharging tank, one coupling member being fitted to the lighter and the other coupling member being fitted to the recharging tank.

However it will be realized that the coupling of the invention can be used whenever it is desired to connect a source of fluid under pressure to a receiving member for the fluid.

An embodiment of the invention will now be described with reference to the single FIGURE of the accompanying drawing which shows, partly in elevation and partly in axial section a coupling for connecting the gas reservoir of a gas lighter to a recharging tank containing a combustible gas liquified under pressure which is to be transferred to the lighter reservoir.

Referring to the drawing a reservoir 1 of the gas lighter has fitted thereto a coupling member including a part 2 formed with a screw-threaded bore extending axially from the outer end thereof and a reduced passage 12 extending from said bore to the interior of the reservoir 1. The outer end of the bore provides a socket to receive a complementary screw-threaded spigot on a coupling member 4 fitted to the recharging tank. The coupling member on the lighter reservoir includes a one-way valve having a valve member 3 which is urged by a compression spring 6 into engagement with a valve seal 11 around an aperture in a part 16 to seal off the conduit provided by said passage, said aperture and said bore. The coupling member 4 has a conduit extending axially therethrough and accommodating a valve member 5 which is urged into engagement with a seat provided around the conduit by a compression spring 7. The arrangement of the valve members and valve seats in each coupling member is such that the internal pressure in the reservoir or the recharging tank, as the case may be, also urges the valve member into engagement with its seat.

A rod 8 extends axially from the valve member 3, through the aperture in the part 16 and is adapted to engage a pusher element 9 captive in the conduit in the member 4 on the outer side of the valve member 5, when the spigot on the member 4 is screwed into the bore, the rod 8 being dimensioned to enter the conduit in the member 4 and push the element 9 against the valve member 4 as the coupling members are screwed together. On the side of valve member 3 remote from the rod 8, a spindle 13 integral with the valve member extends axially therefrom into the passage 12, the compression spring 6 encircling the spindle 13. The compression spring 6 is weaker than the compression spring 7 so that as the coupling members are screwed further together the valve member 3 is lifted from its seat and only subsequently is the valve member 5 lifted from its seat. Similarly when the coupling members are unscrewed, the valve member 3 closes after the valve member 5.

Since the valve member 3 opens before the valve member 5 during the connection of the recharging tank and closes during removal of the recharging tank after the valve member 5, a portion of the gas contained in the reservoir is allowed to escape before and after filling; this is an advantage, both to facilitate reservoir filling and avoid overfilling.

In the embodiment illustrated, the valve member 3 comprises a plate integral with the rod 8 which projects axially of the part 2 and whose free end, during the connection of the coupling members bears against the pusher element 9.

For the valve member 5 of the recharging tank to be able to open, the valve member 3 of the reservoir 1 must offer sufficient resistance thereto.

In the present embodiment, to prevent permanent deformation of the spring 6, which might occur if the spring were compressed until its turns closed completely, an abutment is provided for the valve member 3, comprising a shoulder 10 at the inner end of the screw-threaded bore, the plate of the valve member bearing against the shoulder 10 with its face 3a opposite to the face cooperating with the seat 11 of the valve.

In this way the spring 6 is completely relieved of the pressure which the rod 8 of the lighter valve member 3 must be able to exert against the valve member 5 of the recharging tank to ensure the opening of the latter.

To enable gas to flow through the conduit in the coupling member on the lighter, past the valve member 3 when the face 3a of the valve member 3 is against the annular shoulder 10, there are provided two straight grooves 14,15 parallel to one another in the face 3a of the valve member 3 on either side of the spindle 13.

Alternatively, one or more grooves or ribs can be provided extending over the annular surface of the shoulder 10 between the inner and outer peripheries of that surface.

The valve seat 11 is provided on an annular part 16, whose periphery is in screw-threaded engagement with the screw-threaded bore in the part 2. The part 16 has an axially extending skirt provided with a cutting edge 16a by chamfering or bevelling. The part 16 is of a harder material than the part 2 and during assembly of the coupling member the part 16 is screwed into the part 2 until the cutting edge 16a penetrates into the shoulder 10 of the part 2 and produces a hermetic seal between the parts 16 and 2, without the necessity of providing therebetween a separate sealingtight joint made of an appropriate material. The part 16 can be made of steel and the part 2 of brass, or alternatively the part 16 can be made of any metal and the part 2 can be made of a softer plastics material.

The side of the part 16 remote from the valve member 3 is formed with a diametrical slot 17 into which a screwdriver can engage for screwing the part 16 right into the part 2, to retain the valve member 3 inside the part 2.

A washer 18 threaded around the rod 8 rests against the part 16 and covers at least partially the slot 17 therein and acts as a seat for a sealing ring 19 made of a resilient material and adapted to make the connection of the recharging tank to the part 2 sealingtight.

The coupling described hereinbefore operates as follows: when the reservoir 1 is to be filled with liquefied gas at pressure from a recharging tank, the coupling member 4 of the recharging tank is screwed into the part 2. At a particular moment, the pusher element 9 bearing against the valve member 5 and against the rod 8, causes the opening of the lighter valve member 3, while the valve member 5 still remains closed. A portion of the gas which is still contained in the lighter reservoir can then escape, either between the screw threading of the part 2 and member 4, or through a leakage slot 20 made through the screw threadings of the coupling member 4.

The cooling of the reservoir 1 as a result of the expansion of the gas escaping therefrom creates a drop in pressure in the reservoir which is favorable to its filling.

As the coupling member 4 is screwed further into the part 2, the valve member 3 abuts the shoulder 10 of the part 2, and the rod 8 causes, during a further screwing of the coupling member 4 into the part 2, the opening of the valve 5 after the spigot of the member 4 has started to bear against the sealing ring 19 ensuring that the connection is sealingtight.

The liquefied gas under pressure in the recharging tank can then escape therefrom and enter the lighter reservoir. When the latter is filled, the member 4 is unscrewed from the part 2.

During the unscrewing, the valve member 5 closes and the member 4 leaves the sealing ring 19, the lighter reservoir valve member 3 being then still open, and a certain amount of the gas in the reservoir 1 can escape therefrom through the slot 20, before the member 4 has completely left the part 2, thus preventing the occurrence in the reservoir 1 of a dangerous excess pressure as the result of a possible subsequent rise in the outside temperature.

In an alternative embodiment of the invention the recharging tank is connected to the lighter reservoir not by screwing but, for instance, by bringing the two coupling members axially together and pressing one member against the other on either side of a hermetic joint.

I claim:

1. A coupling for connecting a rechargeable reservoir with a pressurized feed tank comprising a first coupling member for fitting to said reservoir and comprising a first internally screw-threaded annular part and a second complementary externally screw-threaded annular part received in and threadingly connected to said internally screw-threaded annular part, said second annular part having one surface forming a valve seat and an opposite surface formed with a diametrical slot to receive a screwdriver; a washer abutting against said opposite surface and partially covering said slot; a resilient sealing ring bearing against the side of said washer remote from said annular part; a second coupling member for fitting to the feed tank and being formed with an external screw thread complementary to said internal screw thread of said first annular part of said first member so that said coupling members can be screwed together compressing thereby the sealing ring to provide a hermetic seal between said members; a spigot formed on said second coupling member extending when said coupling members are screwed together into said sealing ring; a valve seat in said second coupling member; a valve member for each valve seat; a compression spring for each valve member for urging the latter against its valve seat; means in said coupling members for moving each valve member away from its seat when said coupling members are screwed together; an abutment within said first coupling member for engaging the valve member therein to limit its movement away from its seat to prevent permanent deformation of the spring cooperating therewith, the compression spring in said first coupling member being weaker than that in said second coupling member, whereby when said coupling members are screwed together the valve member in said first coupling member will be displaced from its valve seat before the other valve member is so displaced, one of said parts being of harder material than the other, a sharp annular edge being formed on one of said parts and a shoulder on the other part, whereby when said parts are screwed together said sharp annular edge bites into said shoulder to provide a hermetic seal between said parts.